US012620881B2

(12) United States Patent
McGilton et al.

(10) Patent No.: US 12,620,881 B2
(45) Date of Patent: May 5, 2026

(54) HIGH TEMPERATURE ALTERNATOR FOR GEOTHERMAL APPLICATIONS

(71) Applicant: Alliance for Sustainable Energy, LLC, Golden, CO (US)

(72) Inventors: Ben David McGilton, Denver, CO (US); Lee Jay Fingersh, Westminster, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 284 days.

(21) Appl. No.: 18/320,375

(22) Filed: May 19, 2023

(65) Prior Publication Data

US 2023/0378860 A1 Nov. 23, 2023

Related U.S. Application Data

(60) Provisional application No. 63/344,216, filed on May 20, 2022.

(51) Int. Cl.
| | |
|---|---|
| *H02K 21/14* | (2006.01) |
| *H02K 1/02* | (2006.01) |
| *H02K 1/276* | (2022.01) |
| *H02K 1/32* | (2006.01) |

(52) U.S. Cl.
CPC .............. *H02K 21/14* (2013.01); *H02K 1/02* (2013.01); *H02K 1/276* (2013.01); *H02K 1/32* (2013.01)

(58) Field of Classification Search
CPC ...... H02K 21/14; H02K 1/2766; H02K 1/276; H02K 1/02; H02K 1/32
USPC ......................................................... 310/61
See application file for complete search history.

(56) References Cited

U.S. PATENT DOCUMENTS

| | | | | |
|---|---|---|---|---|
| 3,325,661 A | * | 6/1967 | Parsons ................... | H02K 3/28 |
| | | | | 310/179 |
| 4,007,387 A | * | 2/1977 | Rustecki .............. | H02K 21/042 |
| | | | | 310/156.53 |
| 4,354,127 A | * | 10/1982 | Stroud ..................... | H02K 3/28 |
| | | | | 310/198 |
| 5,248,896 A | | 9/1993 | Forrest | |

(Continued)

FOREIGN PATENT DOCUMENTS

| | | | | |
|---|---|---|---|---|
| AU | 2015275164 B2 | 12/2015 | | |
| CA | 1296088 C | * 2/1992 | .............. | F02B 63/04 |
| WO | 00/36268 | 6/2000 | | |

OTHER PUBLICATIONS

Machine translation of Chinese patent application publication No. CN 103280904 A, Suzhou Hexin Electric Co. Ltd., published Sep. 4, 2013, 20 pages.

(Continued)

*Primary Examiner* — Alex W Mok
(74) *Attorney, Agent, or Firm* — Alexandra M Hall

(57) ABSTRACT

Among other things, the present disclosure relates to an alternator for high temperature applications, (i.e., an alternator capable of operating at temperatures greater than approximately 250° C.). The alternator for high temperature applications may include permanent magnets arranged in a topology which may enable the alternator and connected application system to start operating without an external or auxiliary power source. When used in geothermal applications, the alternator may be capable of using drilling fluid as a coolant.

11 Claims, 16 Drawing Sheets

(56) References Cited

U.S. PATENT DOCUMENTS

| | | | | |
|---|---|---|---|---|
| 5,397,975 | A * | 3/1995 | Syverson | H02K 19/365 |
| | | | | 322/46 |
| 5,502,368 | A | 3/1996 | Syverson et al. | |
| 5,710,471 | A * | 1/1998 | Syverson | H02K 19/36 |
| | | | | 310/58 |
| 5,747,909 | A * | 5/1998 | Syverson | H02H 7/06 |
| | | | | 310/156.56 |
| 5,753,989 | A * | 5/1998 | Syverson | H02J 7/28 |
| | | | | 322/29 |
| 6,191,561 | B1 | 2/2001 | Bartel | |
| 6,198,190 | B1 * | 3/2001 | Umeda | H02K 3/18 |
| | | | | 310/58 |
| 6,198,191 | B1 * | 3/2001 | Chen | H02K 5/225 |
| | | | | 310/239 |
| 6,236,134 | B1 * | 5/2001 | Syverson | H02K 16/00 |
| | | | | 310/156.55 |
| 6,570,290 | B2 * | 5/2003 | Kazmierczak | H02K 3/12 |
| | | | | 310/198 |
| 7,098,561 | B2 * | 8/2006 | Dooley | H02K 11/25 |
| | | | | 310/68 C |
| 7,133,325 | B2 | 11/2006 | Kotsonis et al. | |
| 7,388,311 | B2 * | 6/2008 | Bhargava | H02K 3/28 |
| | | | | 310/198 |
| 7,417,351 | B2 * | 8/2008 | Mori | H02K 3/50 |
| | | | | 310/198 |
| 7,545,056 | B2 * | 6/2009 | Dooley | H02P 25/28 |
| | | | | 318/495 |
| 7,687,950 | B2 | 3/2010 | Kuckes | |
| 7,863,787 | B2 * | 1/2011 | Lafontaine | H02K 9/06 |
| | | | | 310/71 |
| 7,919,894 | B2 * | 4/2011 | Dooley | H02K 3/12 |
| | | | | 310/201 |
| 8,154,167 | B2 * | 4/2012 | Tang | H02K 3/28 |
| | | | | 310/216.069 |
| 8,183,814 | B2 * | 5/2012 | Fuchs | H02P 25/20 |
| | | | | 318/524 |
| 8,564,167 | B2 * | 10/2013 | Fargo | H02P 25/18 |
| | | | | 310/179 |
| 8,567,500 | B2 | 10/2013 | Bedouet et al. | |
| 9,353,730 | B2 * | 5/2016 | Knight | F03D 1/065 |
| 9,534,577 | B2 | 1/2017 | Inman et al. | |
| 10,110,091 | B2 | 10/2018 | Gawski et al. | |
| 10,145,224 | B1 * | 12/2018 | Shenoy | F04D 29/041 |
| 10,221,672 | B2 | 3/2019 | Alturbeh et al. | |
| 10,536,053 | B2 * | 1/2020 | Shenoy | F04D 13/026 |
| 10,879,774 | B2 * | 12/2020 | Qin | H02K 3/28 |
| 10,954,755 | B2 | 3/2021 | Goodman | |
| 11,454,094 | B2 | 9/2022 | Chen et al. | |
| 2006/0283636 | A1 | 12/2006 | Reagan | |
| 2009/0218900 | A1 | 9/2009 | Dickes et al. | |
| 2017/0057373 | A1 * | 3/2017 | Hao | H02K 3/28 |
| 2020/0063543 | A1 | 2/2020 | Pai | |
| 2020/0295640 | A1 | 9/2020 | Tegeler et al. | |

OTHER PUBLICATIONS

Corresponding PCT International Search Report and Written Opinion, mail date Sep. 7, 2023, 7 pages total.

APS Technology, MWD Turbine Alternator, Technical Data Sheet, www.aps-tech.com, 1 page.

Chen, A., "Investigation of Permanent Magnet Machines for Downhole Applications," Thesis for the degree of Philosophiae Doctor, Trondheim Norwegian University of Science and Technology, Jan. 2011, 155 pages.

Electron Energy Corporation, "Samarium Cobalt Magnets," product sheet, Jul. 31, 2023, 2 pages.

Electron Energy Corporation, "Ultra-High Temperature Samarium Cobalt Magnets," spec sheet, https://www.electronenergy.com/ultra-high-temperature-samarium-cobalt-magnets, Jul. 31, 2023, 6 pages.

Guo, H. et al., "Multi-physics design of a novel turbine permanent magnet generator used for downhole high-pressure high-temperature environment," IET Electr. Power Appl., vol. 7, Issue 3, 2013, 10 pages.

Innovating While Drilling, "Baker Hughes builds mud motor for high-temperature geothermal drilling," https://drilling-contractor. org/baker-hughes-builds-mud-motor-for-high-temperature-geothermal-drilling-37722, Nov. 24, 2015, 3 pages.

Iosif, V. et al., "Experimental Characterization of the Maximum Turn-to-Turn Voltage for Inorganic High Temperature Motor," 2014 Electrical Insulation Conference, Philadelphia, Pennsylvania, Jun. 8-11, 2014, 5 pages.

Kim, K-C et al., "Demagnetization Analysis of Permanent Magnets According to Rotor Types of Interior Permanent Magnet Synchronous Motor," IEEE Transactions on Magnetics, vol. 45, No. 6, Jun. 2009, 4 pages.

MOOG "Alternators For Oil and Gas Exploration and Production," product specification sheet, https://www.moog.com/markets/energy/oil-and-gas-exploration/downhole/alternators-for-oil-and-gas-exploration- production.html, 2 pages.

NETL Office of Fossil Energy, Oil & Natural Gas Technology, "Development of a High Pressure/High Temperature Down-hole Turbine Generator," Final Report, Reporting Period Beginning Oct. 1, 2005 and Ending Aug. 20, 2010, Sep. 23, 2010, 51 pages.

Price, Timothy F., "Development of a High-Pressure/High-Temperature Downhole Turbine Generator," Phase I Final Report, Drilling, Completion and Stimulation Program, Mar. 27, 2007, Dexter Magnetic Technologies, 23 pages.

Stefansson, A. et al., "A 300 Degree Celsius Directional Drilling System," IADC Society of Petroleum Engineers, IADC/SPE-189677-MS, 2018, 20 pages.

Zhao, W. et al., "Optimal Design of a Novel V-Type Interior Permanent Magnet Motor with Assisted Barriers for the Improvement of Torque Characteristics," IEEE Transactions on Magnetics, vol. 50, No. 11, Nov. 2014, 4 pages.

* cited by examiner

Time (sec)

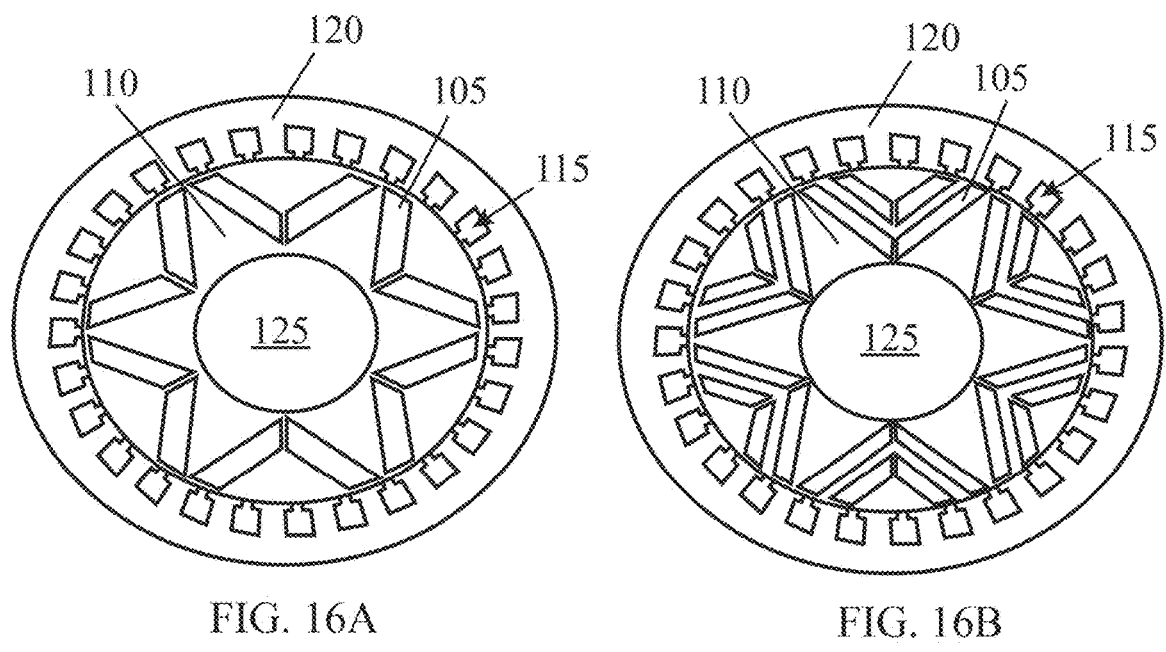
FIG. 16A                    FIG. 16B
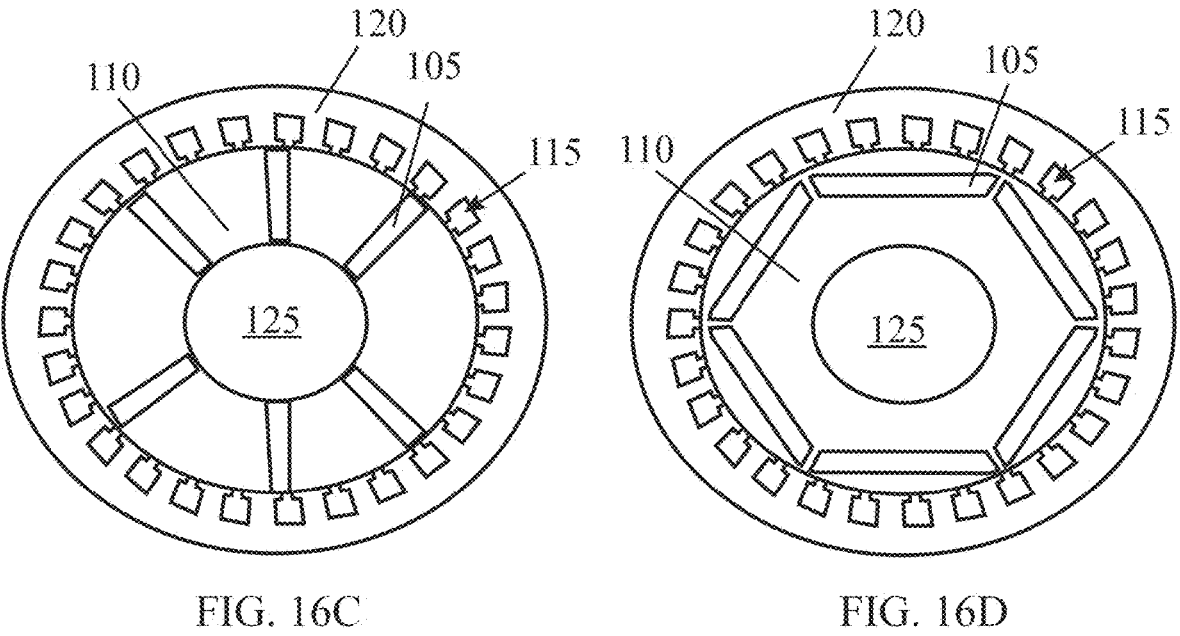
FIG. 16C                    FIG. 16D

HIGH TEMPERATURE ALTERNATOR FOR GEOTHERMAL APPLICATIONS

CROSS-REFERENCE TO RELATED APPLICATION

This application claims priority to U.S. Provisional Patent Application No. 63/344,216 filed on May 20, 2022, the contents of which are incorporated herein by reference in their entirety.

CONTRACTUAL ORIGIN

This invention was made under a CRADA (CRD-24-30778) between GA Drilling LLC. and the National Renewable Energy Laboratory (NREL) operated for the United States Department of Energy (DOE). NREL is managed and operated under Contract No. DE-AC36-08GO28308 awarded by the DOE. The United States government has certain rights in this invention.

BACKGROUND

The potential for geothermal energy generation is significantly limited by the speed and cost of drilling geothermal wells through hard rock formations. Drilling rates for geothermal energy in the United States average approximately 125 feet per day, more than almost 40 times slower than drilling rates through softer rocks in the oil and gas industry. As the rock formations drilled through are different for the two industries, traditional drilling methods and devices used in the oil and gas industry cannot easily be utilized in geothermal energy. To access hotter geothermal energy sources, drilling system components need to withstand temperatures greater than approximately 250° C. Thus, there exists a need for a drilling system which can operate at these high temperatures and effectively drill geothermal energy wells through hard rock formations.

SUMMARY

Among other things, the present disclosure relates to an alternator for high temperature applications, that is, an alternator capable of operating at temperatures greater than approximately 250° C. The alternator for high temperature applications may include permanent magnet poles arranged in a topology which may enable the alternator for high temperature applications and connected application system to start without an external or auxiliary power source. When used in geothermal drilling applications, the alternator for high temperature applications may be capable of using drilling fluid as a coolant. This is because in geothermal drilling applications, the drilling fluid may be slightly cooler (i.e., approximately 50° C. less than) the alternator for high temperature applications.

An aspect of the present disclosure is an alternator for high temperature applications, the alternator including a stator having an interior, and a rotor includes a permanent magnet pole embedded within the rotor in which the rotor is concentrically positioned within the interior of the stator, the permanent magnet is made of samarium cobalt (SmCo). In some embodiments, the alternator also includes rotor shaft which is substantially concentric to the stator and the rotor, the shaft comprises a hole, and a fluid is configured to flow through the hole. In some embodiments, the fluid is a drilling fluid which may be used to cool the alternator. In some embodiments, the alternator may be capable of operating at temperatures greater than approximately 200° C. In some embodiments, the permanent magnet pole comprises a V-type double layer formation which includes a first permanent magnet pole and a second permanent magnet pole meeting at an angle, and the angle is greater than approximately 90°. In some embodiments, the stator includes more than 25 slots. In some embodiments, the stator has 27 slots. In some embodiments, the stator has a double layer winding, and has a 4-slot span. In some embodiments, the double layer winding has greater than 4 turns. In some embodiments, the double layer winding makes 5 turns, and the double layer winding has 10 turns per slot. In some embodiments, the alternator can generate at least 35 kW of power. In some embodiments, the rotor can be operated at a speed in the range of about 500 rpm to about 2000 rpm. In some embodiments, the rotor can be operated at a speed of approximately 900 rpm. In some embodiments, the rotor can be operated at a speed of approximately 1200 rpm.

BRIEF DESCRIPTION OF THE DRAWINGS

Exemplary embodiments are illustrated in the referenced figures of the drawings. It is intended that the embodiments and figures disclosed herein are considered to be illustrative rather than limiting.

FIG. 16A illustrates a V-type single layer, FIG. 16B illustrates a V-type double layer, FIG. 16C illustrates a spoke type, and FIG. 16D illustrates a square type of interior permanent magnet machine topologies which may be used in various embodiments of the alternator for high temperature applications, according to some aspects of the present disclosure.

REFERENCE NUMERALS

Figure 1:
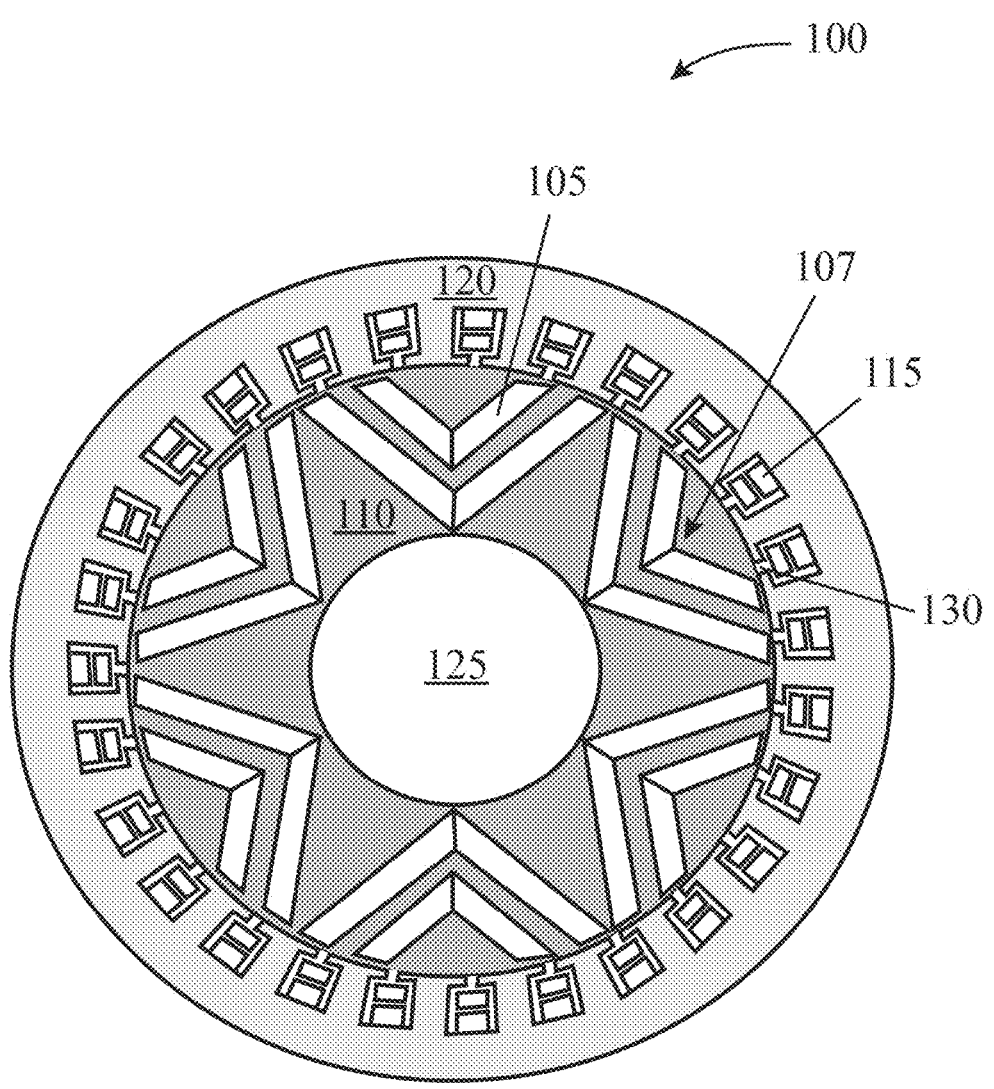
FIG. 1 illustrates a top view of an exemplary alternator for high temperature applications, according to some aspects of the present disclosure.

100 . . . alternator for high temperature applications
105 . . . permanent magnet pole
107 . . . angle
110 . . . rotor
115 . . . coils
120 . . . stator
125 . . . shaft space
130 . . . slot
135 . . . rotor shaft
140 . . . end caps
145 . . . outer shell

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to an alternator for high temperature applications, that is, an alternator capable of operating at temperatures in excess of approximately 250° C. The alternator for high temperature applications may include permanent magnet poles arranged in a topology which may enable the alternator for high temperature applications and connected application system to start without an external or auxiliary power source. When used in geothermal drilling applications, the alternator for high temperature applications may be capable of using drilling fluid as a coolant. This is because in geothermal drilling applications, the drilling fluid may be slightly cooler (i.e., approximately 50° C. less than) the alternator for high temperature applications.

Typical pulsed electric drilling for geothermal applications requires large amounts of power (for example, up to approximately 300 kW). The alternator for high temperature applications as described herein may produce electricity from pumped drilling fluid to power the pulsed electric drilling. The alternator for high temperature applications may be capable of fitting within a downhole drilling environment, that is, the alternator for high temperature applications may be small enough to fit within a casing or pipe having an outer diameter of approximately 10.25 inches.

Figure 2:
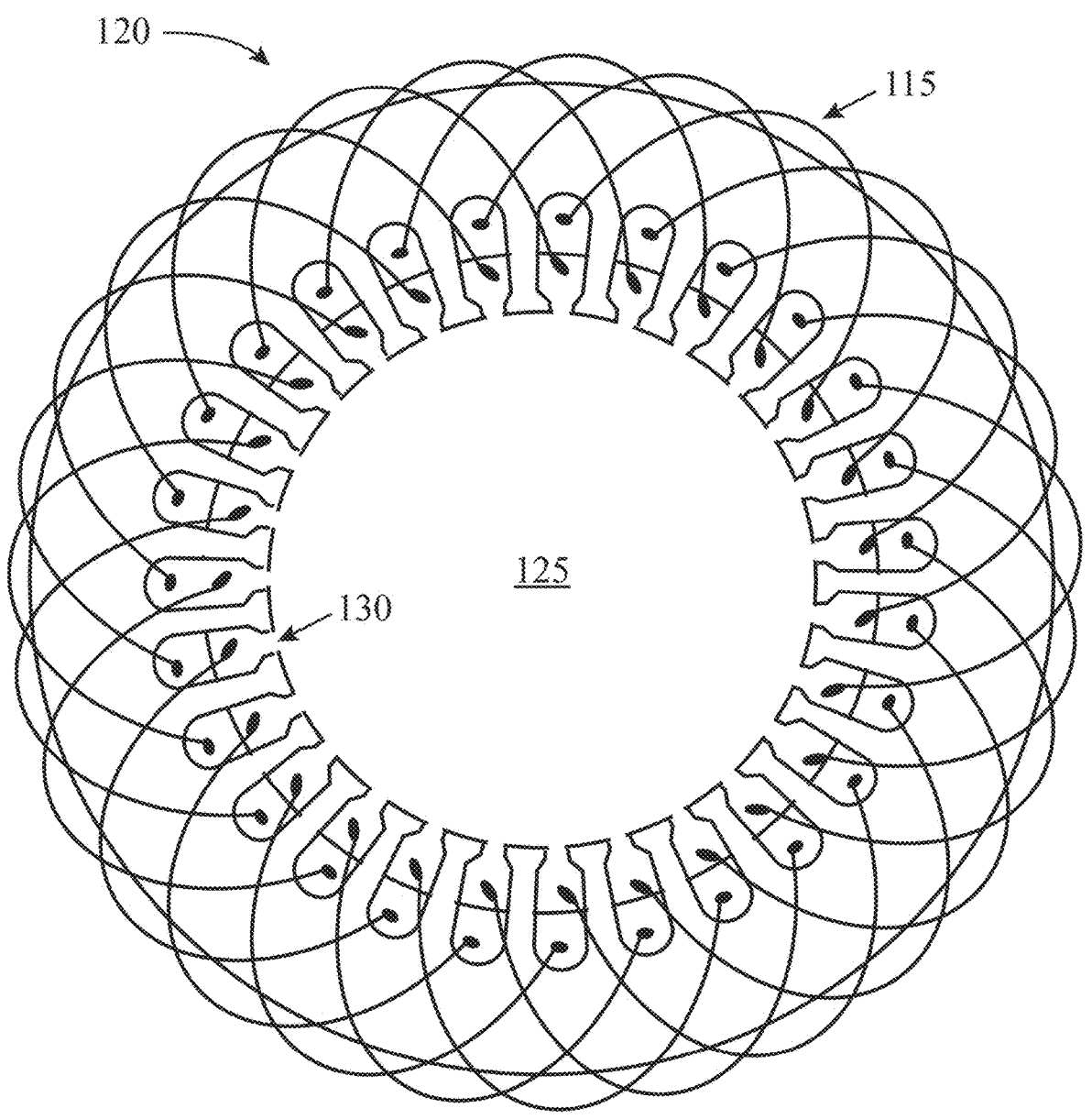
FIG. 2 illustrates a coil winding layout for an exemplary alternator for high temperature applications, according to some aspects of the present disclosure.

FIG. 1 illustrates a top view of an exemplary alternator for high temperature applications 100, according to some aspects of the present disclosure. In some embodiments, the alternator for high temperature applications 100 may include the following components: a plurality of permanent magnet poles 105, a rotor 110, a plurality of coils 115 of wire, a stator 120, and a shaft space 125 (i.e., a hole where a rotor shaft 135 (not shown in FIG. 1) may be inserted). In the example of FIG. 1, the alternator for high temperature applications 100 includes six (6) permanent magnet poles 105, however, more or less permanent magnet poles 105 may be used. In the example of FIG. 1, the permanent magnets poles 105 had a pole height of approximately 8 mm, although the permanent magnet pole 105 heights may be in the range of about 1 mm to about 50 mm. In the example of FIG. 1, the permanent magnets poles 105 are arranged in a V-type double layer formation, meaning the plurality of permanent magnet poles 105 are arranged in two substantially parallel V shapes, but other topologies may be used (see FIGS. 16A-D). In the example of FIG. 1, the angles between the permanent magnet poles 105 were greater than about 90°, however, angles may be in the range of about 10° to about 140°. In the example of FIG. 1, the alternator for high temperature applications 100 has an axial length of approximately 600 mm (not shown in FIG. 1), although axial lengths in the range of about 50 mm to about 1000 mm may be used. In the example of FIG. 1, the stator 120 has 27 slots, however, the number of slots may be in the range of about 10 to about 50. In some embodiments, the alternator for high temperature applications 100 may have a 6 pole design with a 27 slot stator 120 and double layer coil 115 windings and 4 slot span, resulting in a high winding factor and maximum efficiency while maintaining a torque ripple of less than about 3%. The winding configuration of the coils 115 of the alternator for high temperature applications 100 is shown in FIG. 2. As shown in FIG. 2, the winding for the alternator for high temperature applications 100 includes approximately five (5) turns for a total of about 10 turns per slot 130, however, the turns and windings of the coils 115 could be larger or smaller than this example. The windings of the coils 115 and the slots 130 may concentrically surround the shaft space 125.

In some embodiments, the rotor 110 may be composed of laminated stacks with attached and/or embedded permanent magnet poles 105. The permanent magnet poles 105 may be samarium cobalt magnets which are pre-magnetized and coated as required for operation at temperatures greater than 250° C. The rotor shaft 135 (see FIGS. 15A-B) may be made of aluminum or another common metal. In some embodiments, the process for manufacturing the rotor 110 may include shaft machining (i.e., forming the rotor shaft 135 (see FIGS. 15A-B) from a solid rod), attaching permanent magnet poles 105 to the rotor shaft 135, and then assembling bearings to the rotor shaft 135 to form the rotor 110. In some embodiments, the rotor shaft 135 may be made of copper, aluminum, and/or steel. In some embodiments, the permanent magnet poles 105 may be coated to operate at a temperature of approximately 250° C.

In some embodiments, the stator 120 may include a stack of electrical steel laminations, which may be coated in lacquer for insulation, and are wound with wire coils 115. The electrical steel laminations may be stamped out of an electrical steel sheet. The laminations may stacked in layers to make up body of the stator 120, which may prevent eddy currents in the stator 120. Wire coils 115 may be wound onto the stator 120. The wire of these coils 115 may coated in a high-temperature insulating material. After installing wire coils 115 onto the stator 120, epoxy resin may be used to fill gaps between coils 115 to prevent leaks and arcing. Dipping and vacuum pressure impregnation forces this resin through the coils 115 of the stator 120. The stator 120 may be baked to allow the high temperature epoxy resin to cure (i.e., set). In some embodiments, the process of manufacturing the stator 120 may include stamping laminations of electrical steel (which may be coated) onto relatively flat sheets, laminating/stacking the stamped laminations of electrical steel to form the stator 120 core, winding insulation-coated wire (for example, copper) into coils 115 around the stator 120 core, and sealing the stator 120 to prevent shorting or arcing.

Figure 3:
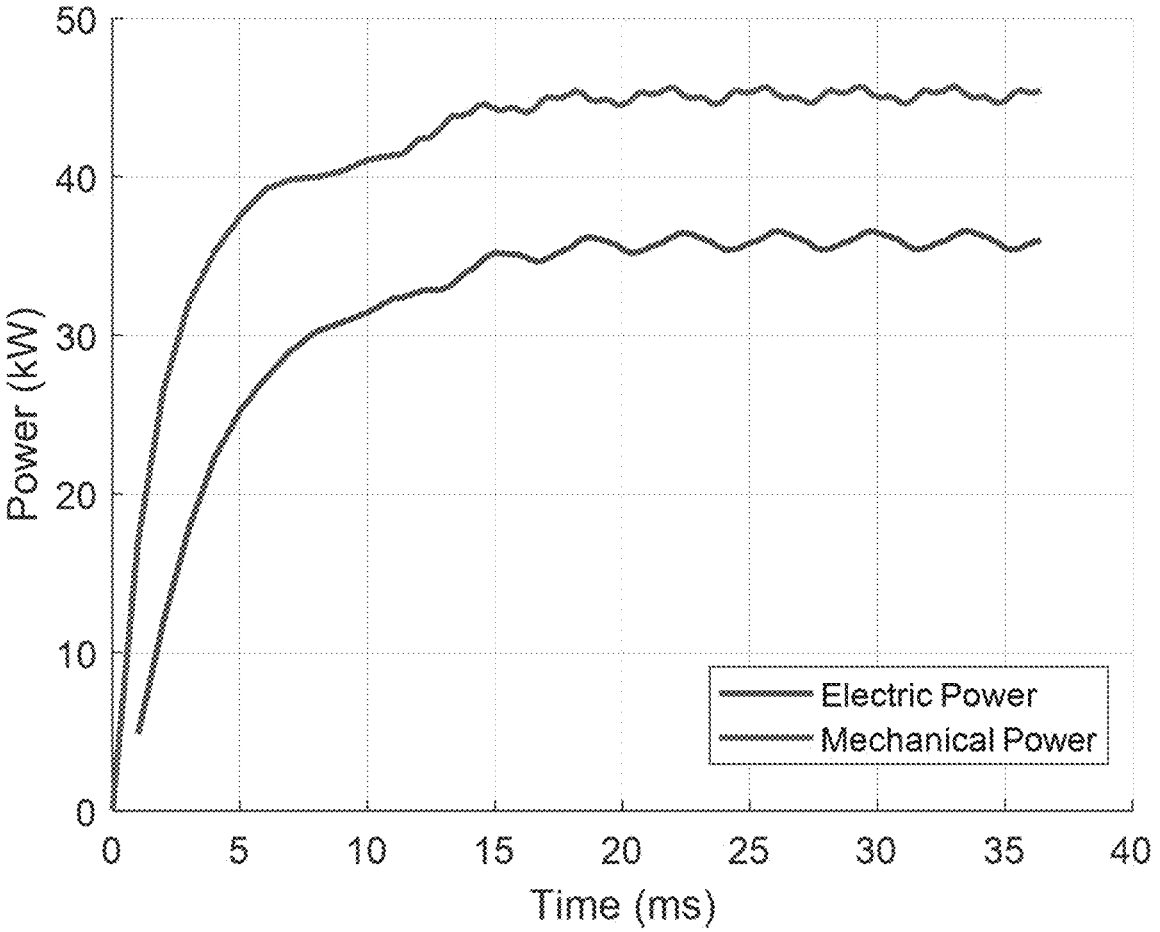
FIG. 3 illustrates the mechanical power and electrical power at operating conditions of approximately 900 rpm and approximately 350° C. for an exemplary alternator for high temperature applications, according to some aspects of the present disclosure.

FIG. 3 illustrates the mechanical power-in and electrical power-out of an alternator for high temperature applications 100 as described in some embodiments. As shown in FIG. 3, the alternator for high temperature applications 100 may achieve a target power rating of approximately 35 kW at a rotor 110 speed of approximately 900 rpm with a system temperature of approximately 350° C. This demonstrates how the alternator for high temperature applications 100 may be operated at high temperatures (i.e., temperatures greater than about 250° C.) while still performing as desired. The efficiency of the alternator for high temperature applications 100 is approximately 80% with a mechanical torque of approximately 480 Nm (see FIG. 4) at the power rating of approximately 35 kW at a rotor 110 speed of approximately 900 rpm with a system temperature of approximately 350° C. The phase voltages for the alternator for high temperature applications 100 are shown in FIGS. 5A and 5B for operation at a power rating of approximately 35 kW at a rotor 110 speed of approximately 900 rpm with a system temperature of approximately 350° C.

Figure 4:
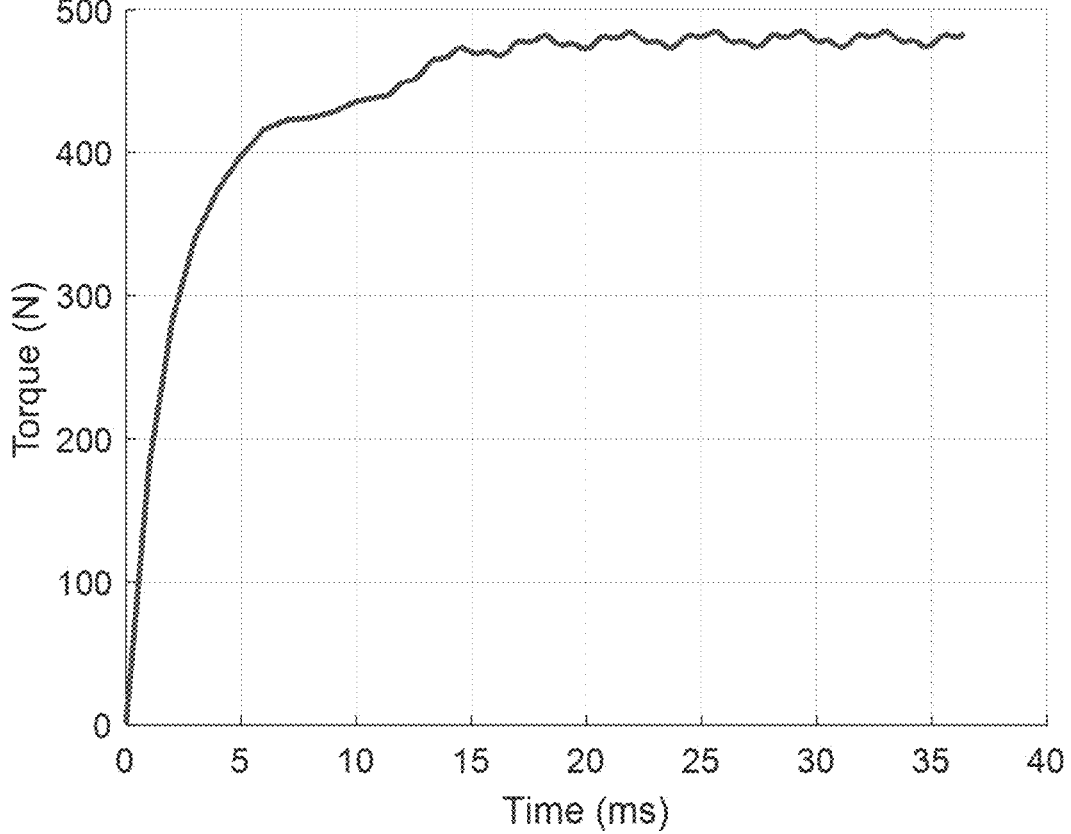
FIG. 4 illustrates the mechanical torque for approximately 35 kW power output at operating conditions of approximately 900 rpm and approximately 350° C. for an exemplary alternator for high temperature applications, according to some aspects of the present disclosure.

FIG. 4 illustrates the mechanical torque for approximately 35 kW power output at operating conditions of approximately 900 rpm and approximately 350° C. for an exemplary alternator for high temperature applications 100, according to some aspects of the present disclosure. FIG. 4 illustrates the mechanical torque required to produce the electrical power (i.e., the mechanical loading) for the alternator for high temperature applications 100 was approximately 480 Nm, which it was able to achieve after about 10 ms.

Figure 5A:
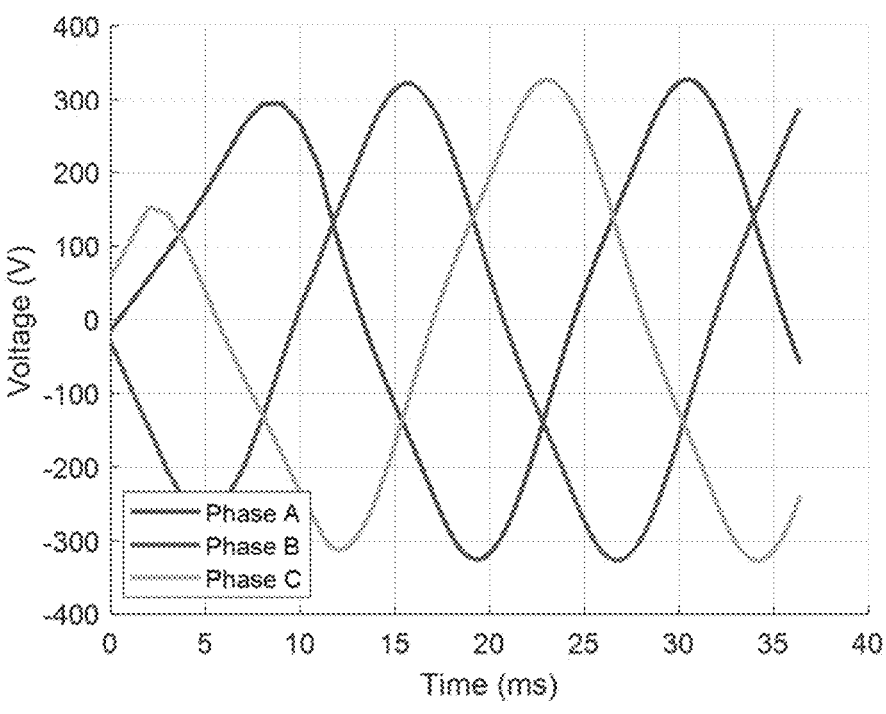
FIG. 5A illustrates phase voltages and FIG. 5B illustrates phase currents for an exemplary alternator for high temperature applications, according to some aspects of the present disclosure.
Figure 5B:
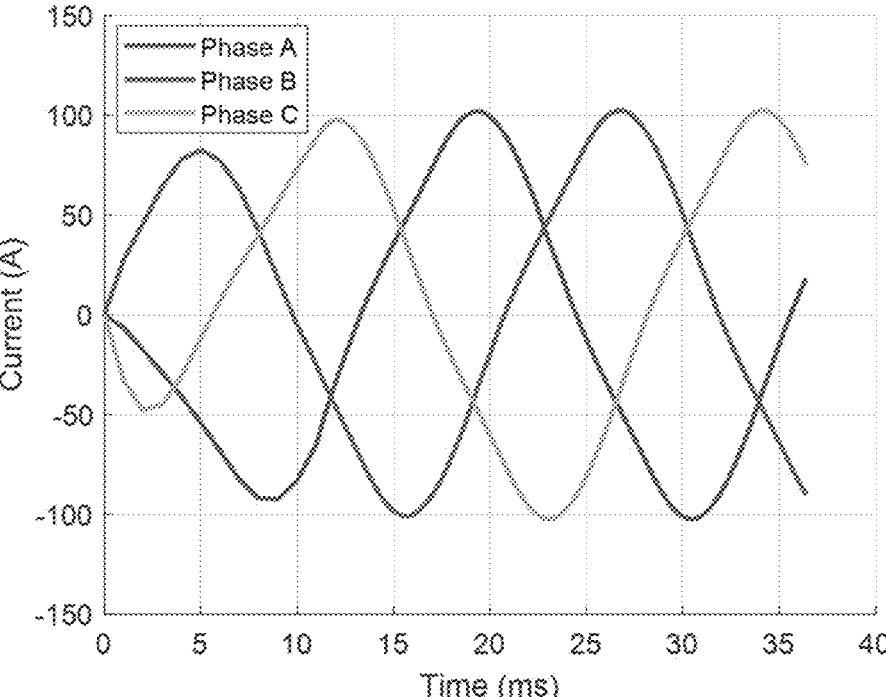

FIG. 5A illustrates phase voltages and FIG. 5B illustrates phase currents for an exemplary alternator for high temperature applications 100, according to some aspects of the present disclosure. The phase voltages were in the range of about −325 V to about 330V and the phase currents were in the range of about −105 A to about 105 A. In testing, the alternator for high temperature applications 100 had a peak voltage per phase of approximately 327 V and a peak current of approximately 102 A. The predicted full-scale voltage if 9 alternators for high temperature applications 100 were used together would be less than about 3 kV.

Figure 6:
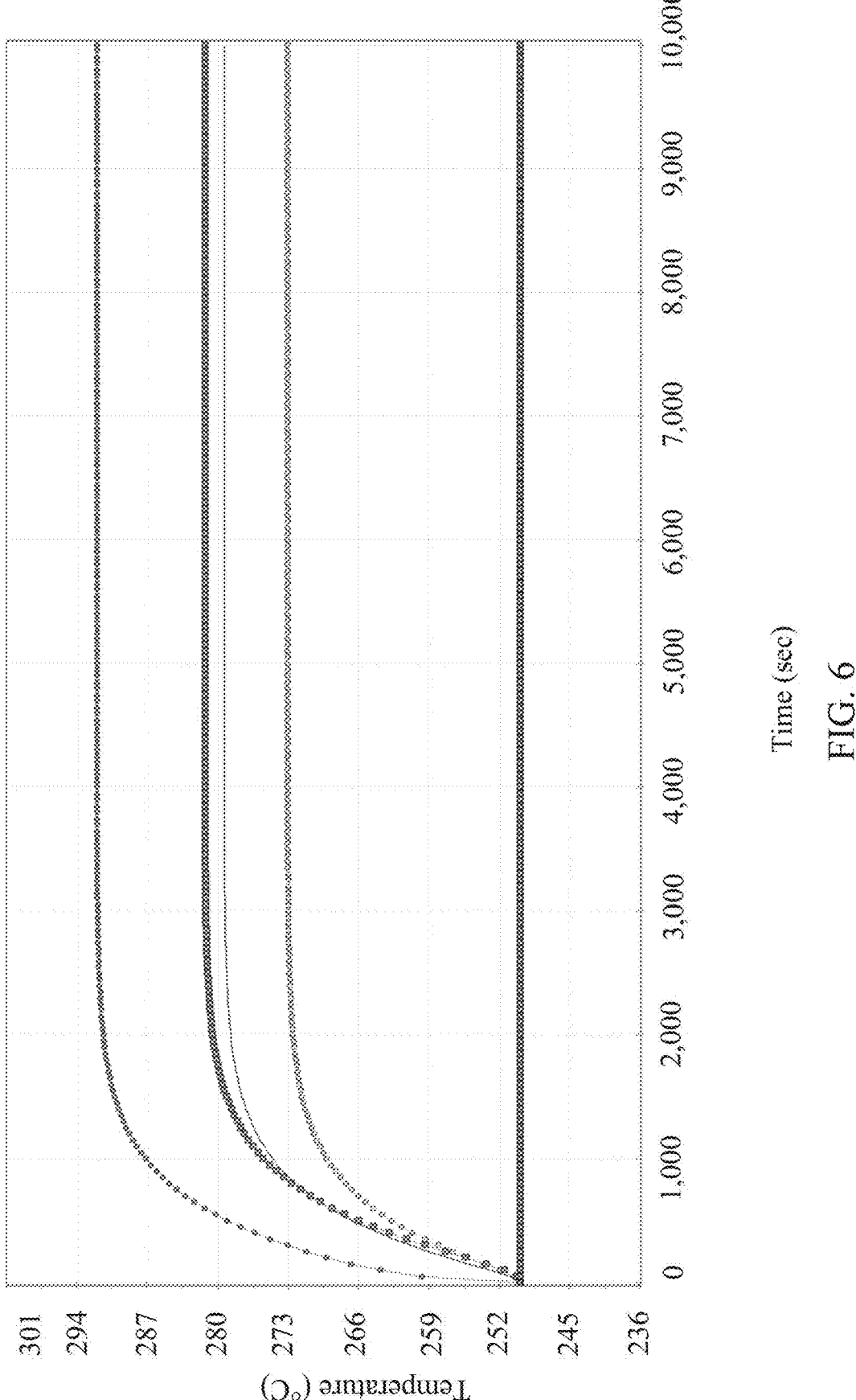
FIG. 6 illustrates transient thermal test results for a rotor speed of approximately 900 rpm showing temperature rise reaching steady state conditions of an exemplary alternator for high temperature applications, according to some aspects of the present disclosure.
Figure 7:
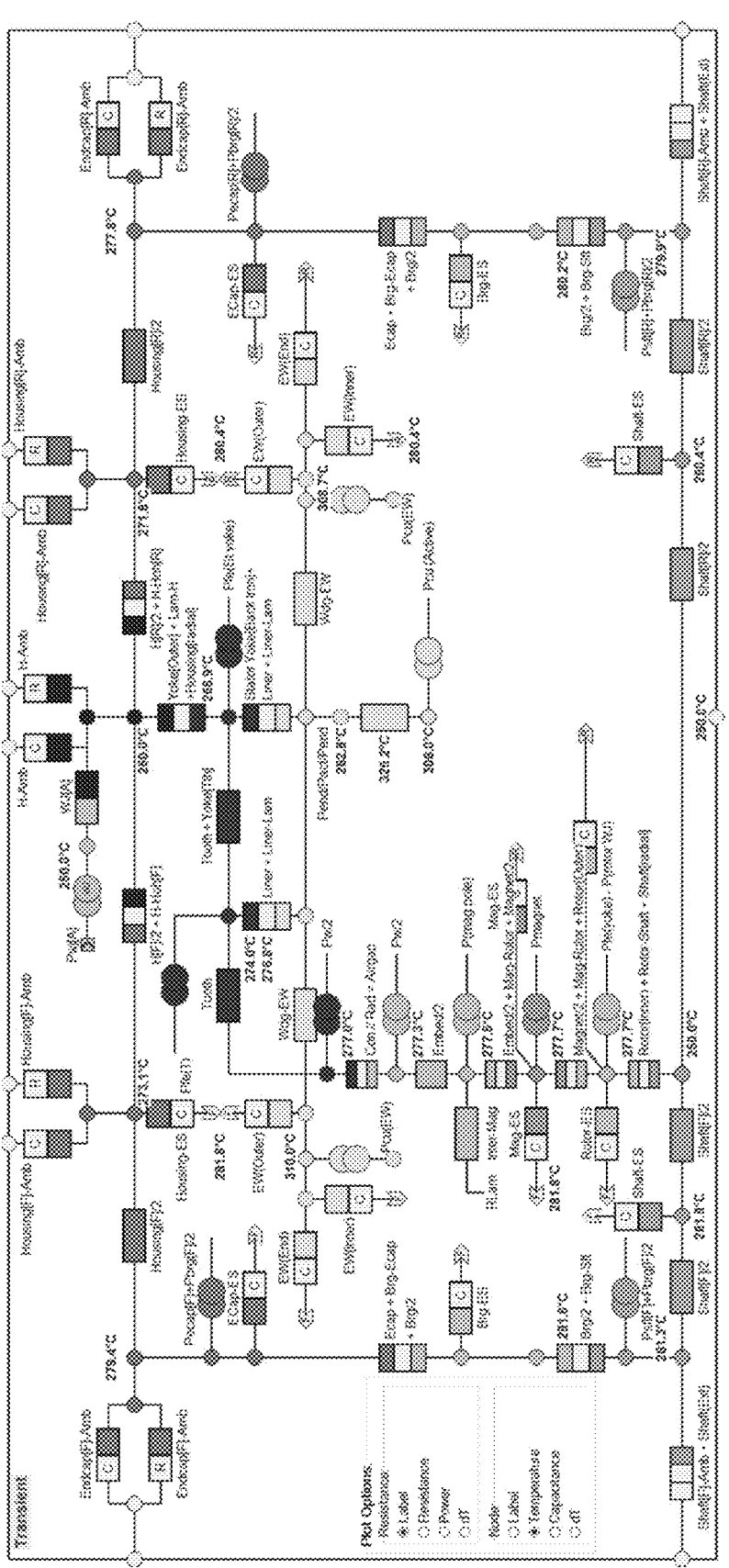
FIG. 7 illustrates the temperatures of components within an exemplary alternator for high temperature applications during transient thermal testing for a rotor speed of approximately 900 rpm, according to some aspects of the present disclosure.

FIG. 6 illustrates transient thermal test results for a rotor 110 speed of approximately 900 rpm showing temperature rise reaching steady state conditions of an exemplary alternator for high temperature applications 100, according to some aspects of the present disclosure. The key component temperatures are the permanent magnet poles 105 and the coils 115 of wire which together most determine the alternator for high temperature application's 100 performance. The temperature of these components over an approximately 10,000 second time interval are shown in FIG. 6. The temperature of the permanent magnet poles 105 and coils 115 of wires reach an approximately steady state and the average temperature does not exceed approximately 310° C., as shown in FIG. 7.

When the alternator for high temperature applications 100 is used for geothermal drilling applications, the drilling rate may be controlled by increasing the flow rate (and therefore the rotor 110 speed and power induced by the alternator for high temperature applications 100). The rotor 110 in the alternator for high temperature applications 100 may be capable of operating at a range of approximately 500 rpm to approximately 2000 rpm.

Figure 8:
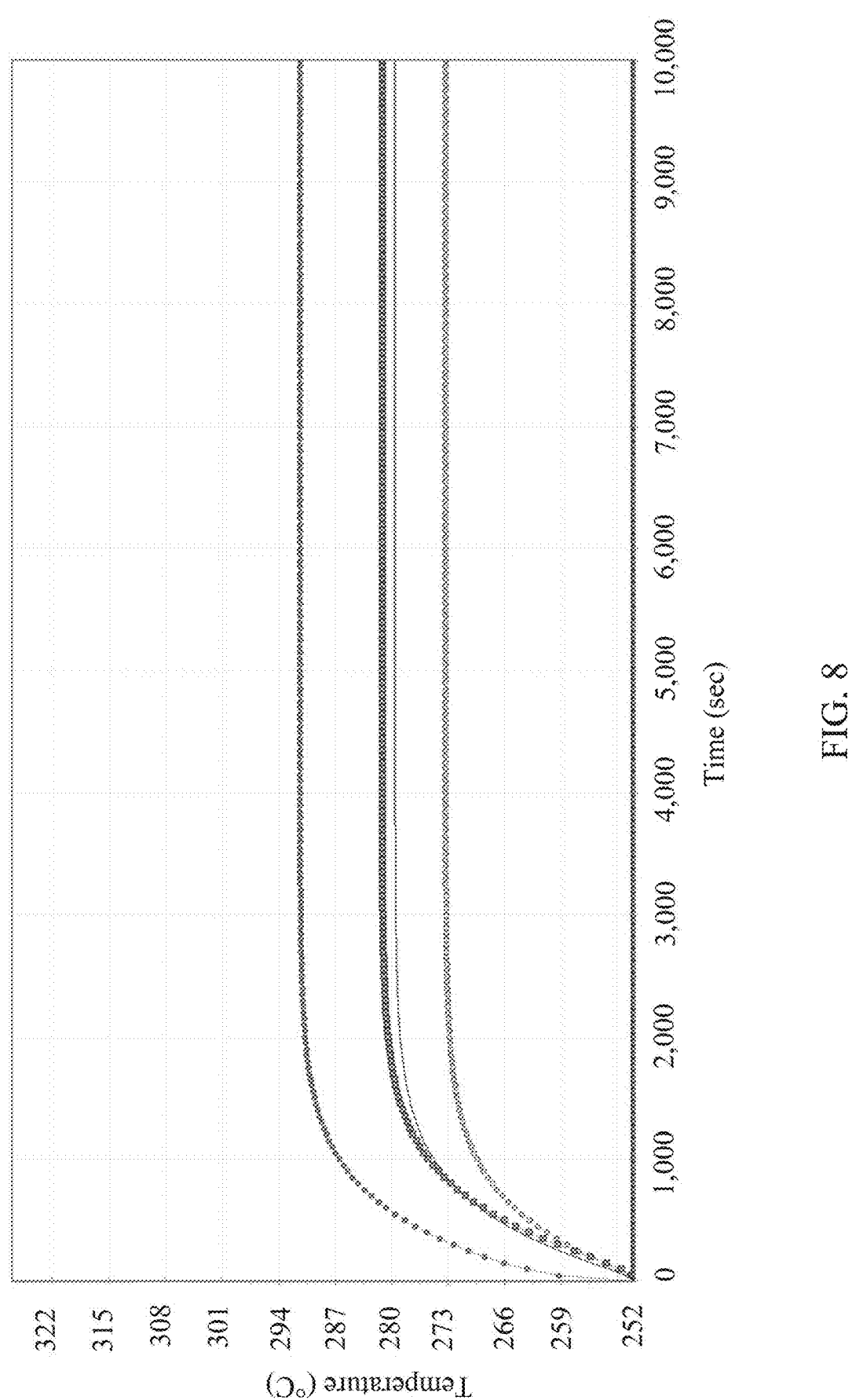
FIG. 8 illustrates transient thermal test results for a rotor speed of approximately 1200 rpm showing temperature rise reaching steady state conditions of an exemplary alternator for high temperature applications, according to some aspects of the present disclosure.
Figure 9:
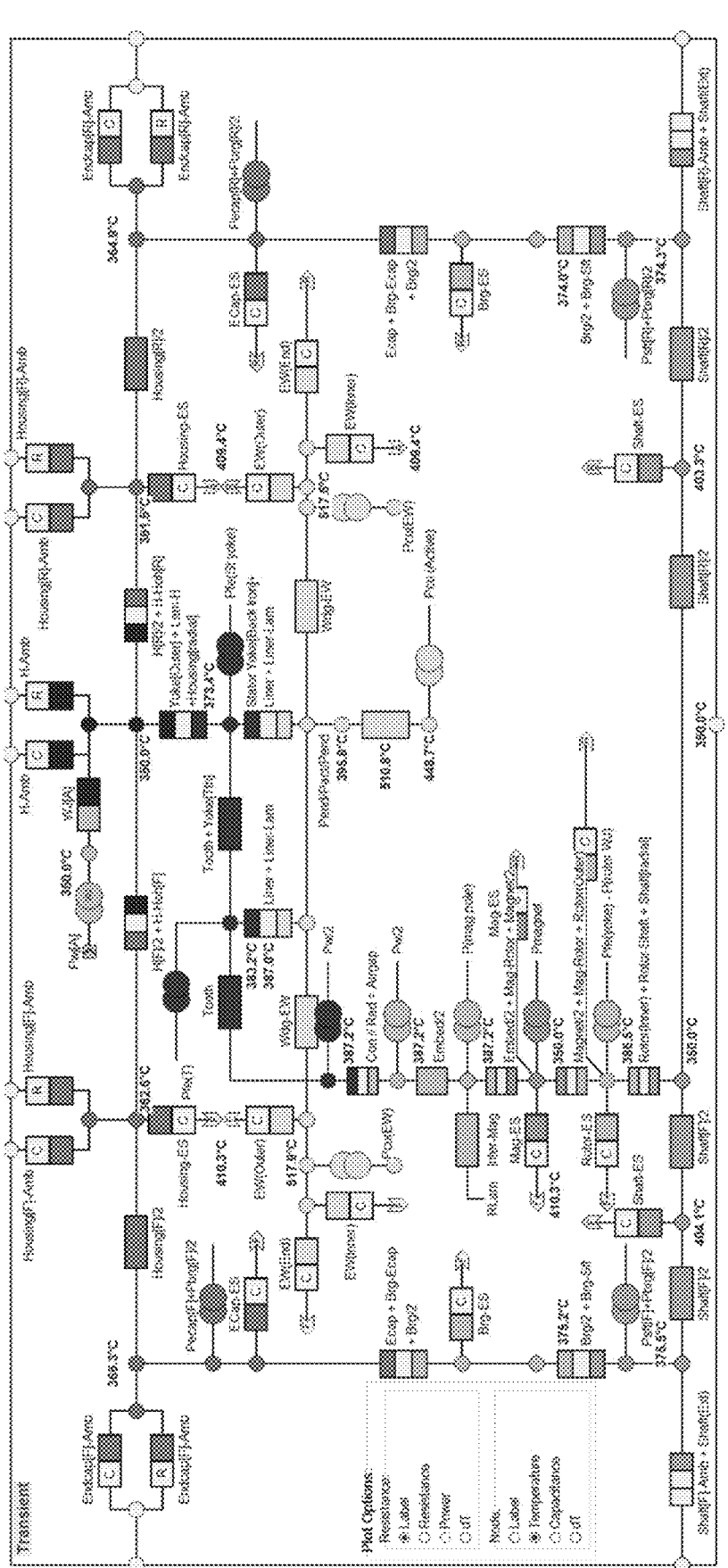
FIG. 9 illustrates the temperatures of components within an exemplary alternator for high temperature applications during transient thermal testing for a rotor speed of approximately 1200 rpm, according to some aspects of the present disclosure.

FIG. 8 illustrates transient thermal test results for a rotor speed of approximately 1200 rpm showing temperature rise reaching steady state conditions of an exemplary alternator for high temperature applications, according to some aspects of the present disclosure. The torque loading and inlet temperature were maintained approximately consistent during the operating at a rotor 110 speed of approximately 1200 rpm. When used in drilling applications (such as for geothermal drilling), the drilling rate of the drilling system could be controlled by the alternator. This may be done using the flow rate of drill fluid through the rotor shaft 135, which impacts the rotor 110 speed and thus the power produced by the alternator. In the testing in FIG. 8, when the rotor 110 speed was increased to approximately 1200 rpm the fluid (i.e., drilling fluid) flow rate through the rotor shaft 135 was proportionally increased (mimicking how increasing rotor 110 speed could be enacted). The results shown in FIG. 8 indicate that the proportionally increased fluid flow rate compensates for the increased power production and the temperature rises are approximately equivalent to as at an approximately 900 rpm operating speed (that is, the drilling fluid reduces the temperature of the alternator for high temperature applications 100 at this rotor 110 speed). FIG. 9 illustrates the temperatures of components within an exemplary alternator for high temperature applications 100 during transient thermal testing for a rotor 110 speed of approximately 1200 rpm, according to some aspects of the present disclosure.

Figure 10:
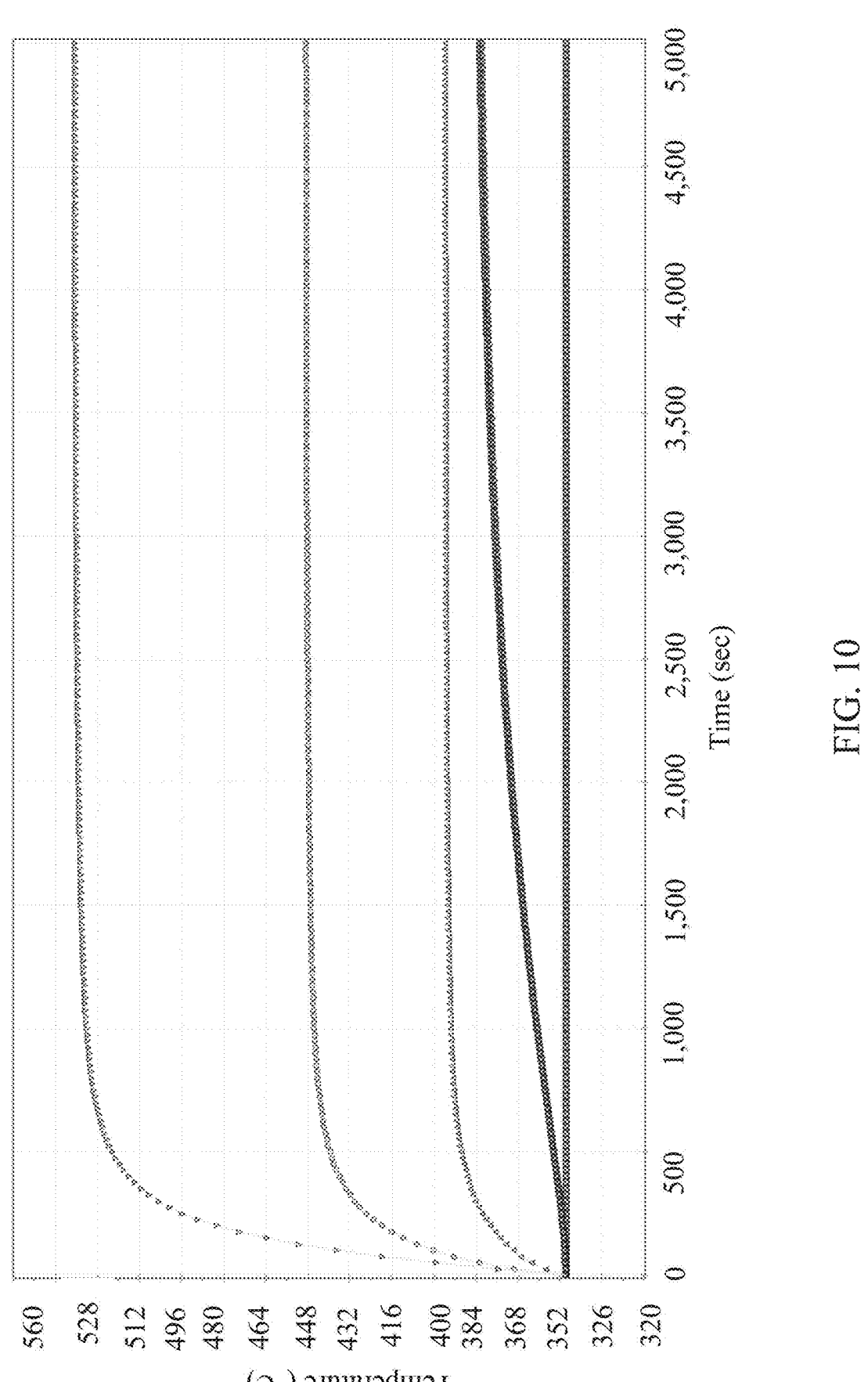
FIG. 10 illustrates transient thermal test results showing safe operating conditions for the alternator for high temperature applications, according to some aspects of the present disclosure.
Figure 11:
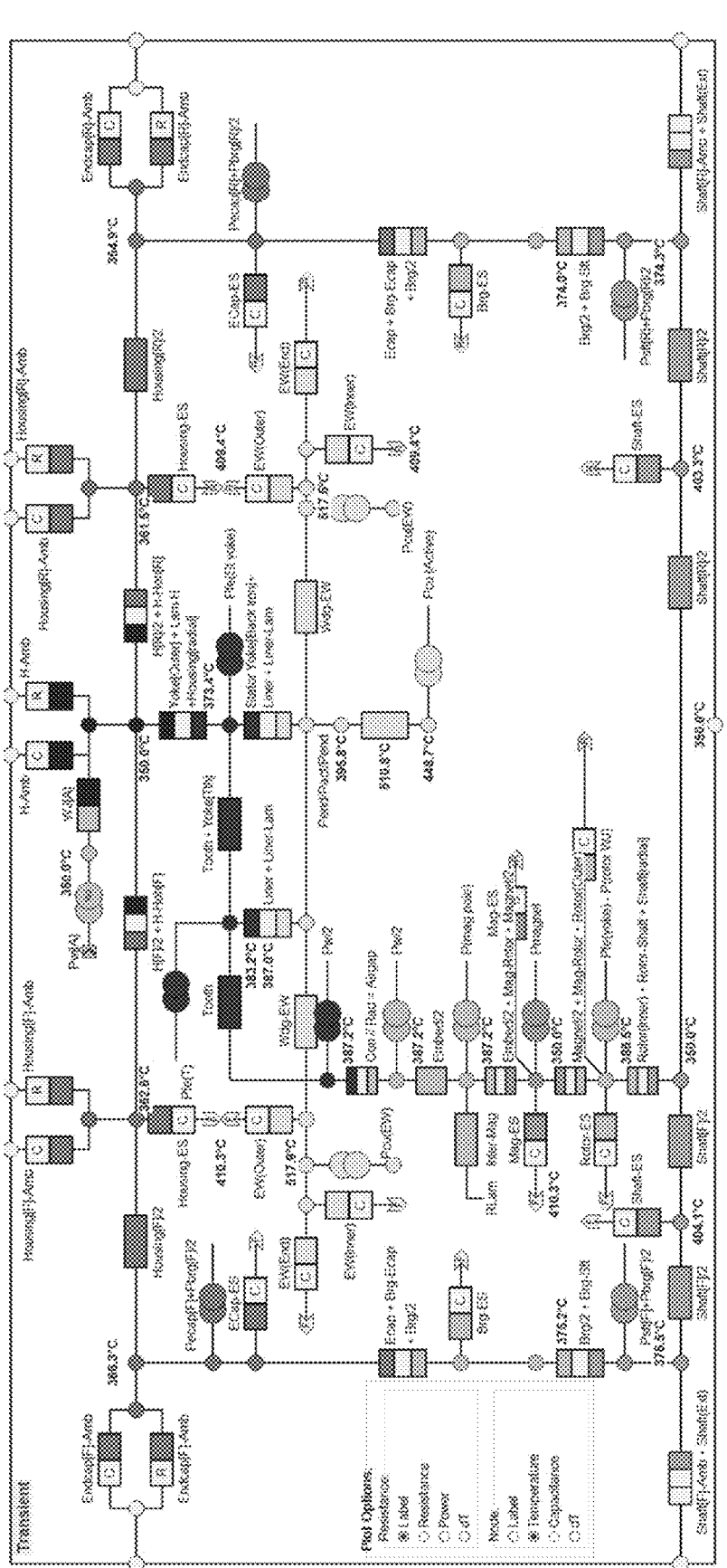
FIG. 11 illustrates the temperatures of components within an exemplary alternator for high temperature applications during transient thermal testing showing safe operating conditions for the alternator for high temperature applications, according to some aspects of the present disclosure.

For this test the rotor 110 speed was approximately 900 rpm with a flow rate of approximately 4160 l/m, and a load torque of approximately 480 Nm. The temperature was maintained at approximately 350° C. to mimic actual operating conditions. The results (shown in FIGS. 10 and 11) indicate that a steady state temperature was achieved with average temperatures for coils 115 of wires of about 448.7° C. and permanent magnet poles 105 of about 387° C. The alternator for high temperature applications 100 could thus operate before a maximum temperature of 400° C. is exceeded. FIG. 10 illustrates the transient thermal test results showing safe operating conditions for the alternator for high temperature applications 100, according to some aspects of the present disclosure. FIG. 11 illustrates the temperatures of components within an exemplary alternator for high temperature applications 100 during transient thermal testing showing safe operating conditions for the alternator for high temperature applications 100, according to some aspects of the present disclosure.

Figure 12:
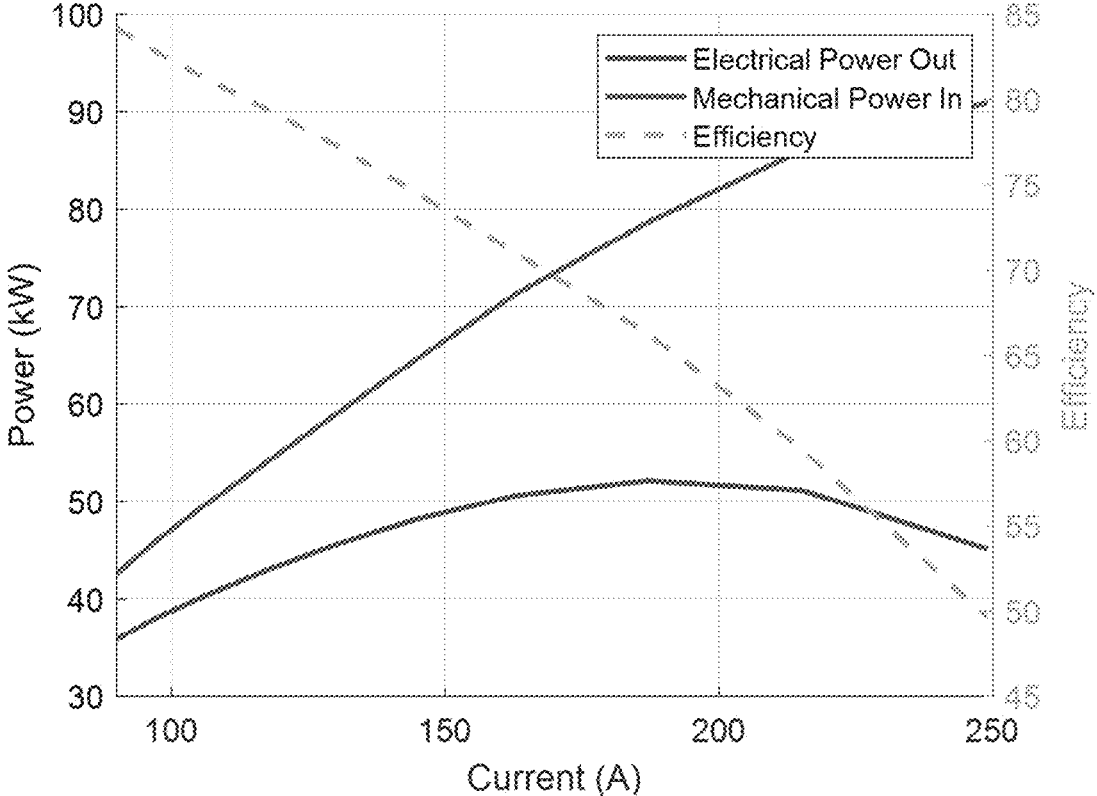
FIG. 12 illustrates mechanical power in, electrical power generated, and efficiency with increasing current draw for the alternator for high temperature applications, according to some aspects of the present disclosure.

FIG. 12 illustrates mechanical power in, electrical power generated, and efficiency with increasing current draw for the alternator for high temperature applications 100, according to some aspects of the present disclosure. To determine the maximum power the alternator for high temperature applications 100 and associated geothermal drilling system could potentially produce at a rotor 110 speed of approximately 900 rpm, a series of tests were performed where the current draw was increased by lowering the load resistance, starting at the approximately 35 kW operating point. The results are shown in FIG. 12 where the electrical output rises until a peak point of approximately 52 kW whereafter the increase in current does not increase the electrical power generated. The efficiency decreases with increasing current draw. FIG. 12 indicates that increasing the electrical power to about 45 kW is possible while maintaining an efficiency of approximately 77%. It appears there was minimal demagnetization of the permanent magnet poles 105 even at the peak of approximately 52 kW rating.

Figure 13:
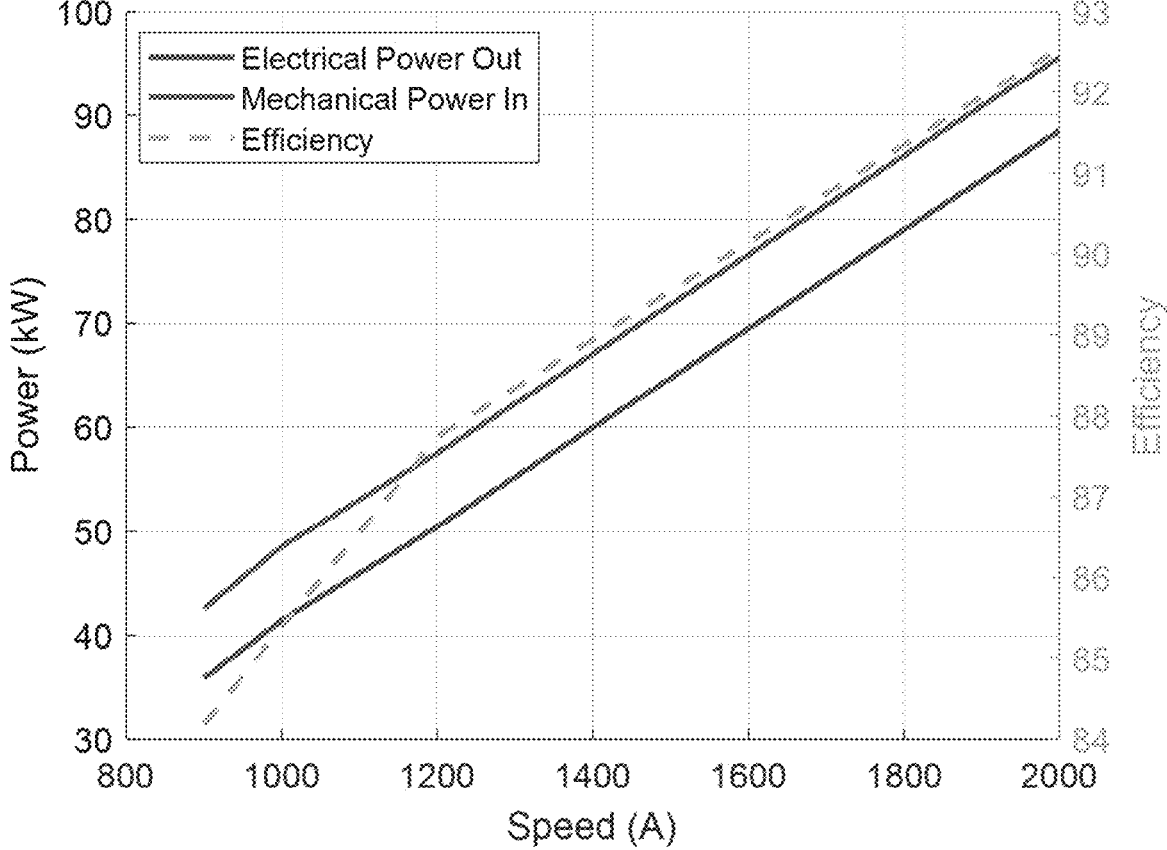
FIG. 13 illustrates mechanical power in, electrical power generated, and efficiency with increasing rotor speed for the alternator for high temperature applications, according to some aspects of the present disclosure.
Figure 14:
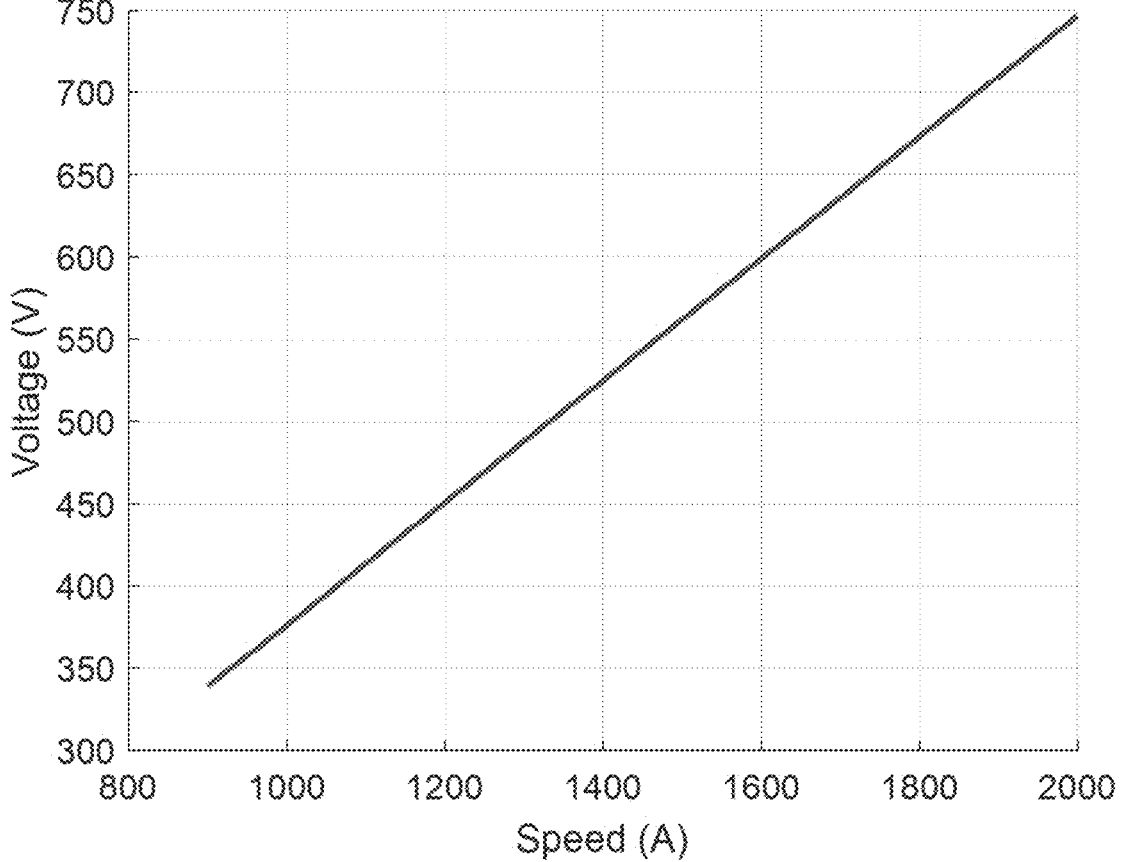
FIG. 14 illustrates induced peak phase voltage with increasing rotor speed for the alternator for high temperature applications, according to some aspects of the present disclosure.

FIG. 13 illustrates mechanical power in, electrical power generated, and efficiency with increasing rotor speed for the alternator for high temperature applications 100, according to some aspects of the present disclosure. In some embodiments, when the alternator for high temperature applications 100 is used for geothermal drilling, the drilling speed of the entire drilling system may be controlled by controlling the alternator for high temperature applications 100 speed (i.e., the rotor 110 speed) using the drilling fluid flow rate. Rotor 110 speeds were tested at approximately 900 rpm, approximately 1200 rpm, and approximately 2000 rpm. Results shown that the power increases approximately linearly with the flow rate of the drilling fluid (see FIG. 13). The efficiency of the drilling system increases with an increase of rotor 110 speed. For these tests, the current draw was maintained at approximately 92 A, meaning the increase in power is a result of the increased voltage, as shown in FIG. 14. FIG. 14 illustrates induced peak phase voltage with increasing rotor speed for the alternator for high temperature applications 100, according to some aspects of the present disclosure.

Figures 15A, 15B:
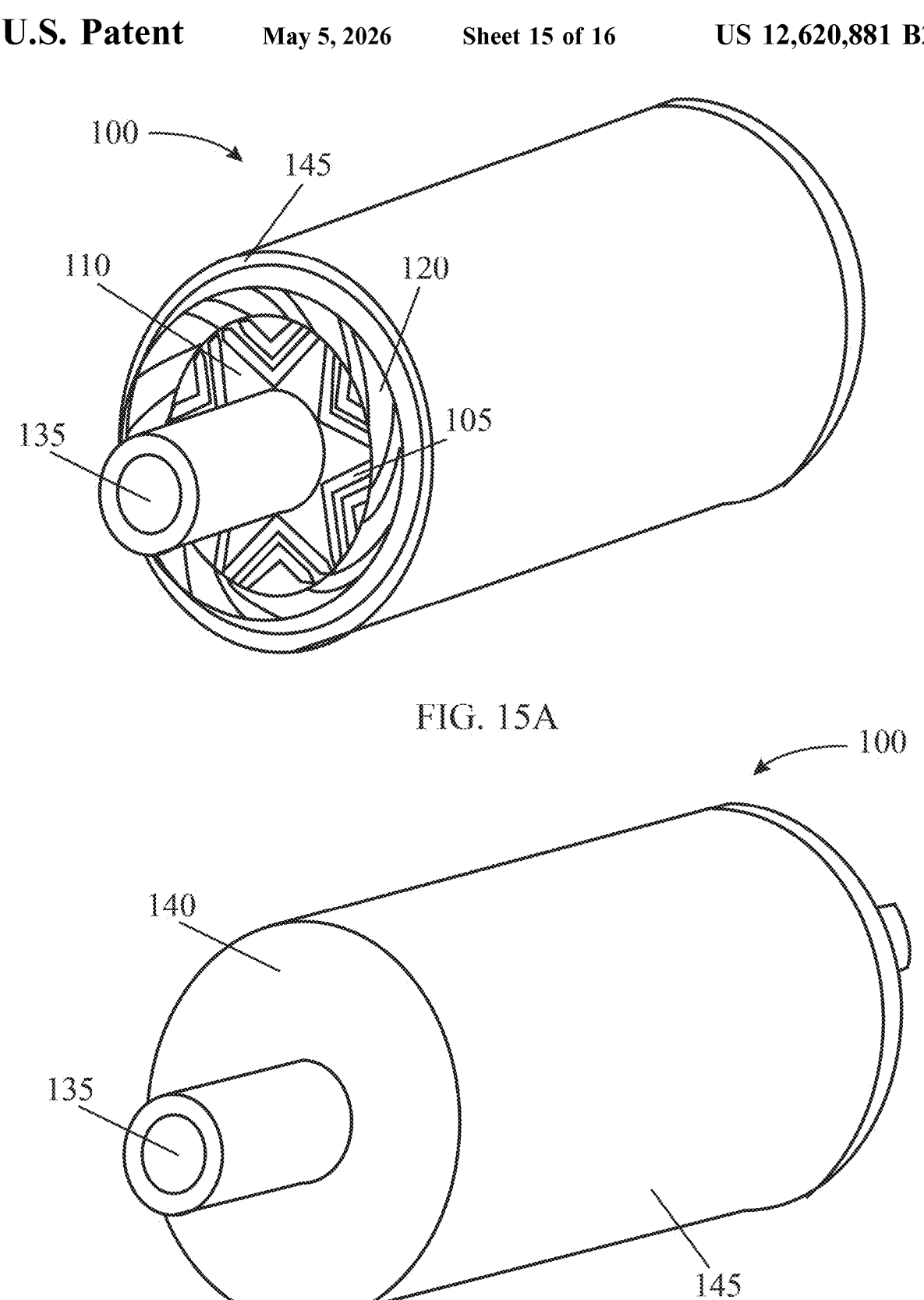
FIGS. 15A-B illustrates a computer aided design (CAD) view of the alternator for high temperature applications with end caps hidden (FIG. 15A) and endcaps shown (FIG. 15B), according to some aspects of the present disclosure.

FIGS. 15A-B illustrates a computer aided design (CAD) view of the alternator for high temperature applications 100 with end caps 140 hidden (FIG. 15A) and endcaps 140 shown (FIG. 15B), according to some aspects of the present disclosure. In these views, the rotor shaft 135 is shown, and the rotor 110 is concentrically connected to the rotor shaft 135 and located within the stator 120.

FIG. 16A illustrates a V-type single layer, FIG. 16B illustrates a V-type double layer, FIG. 16C illustrates a spoke type, and FIG. 16D illustrates a square type of interior permanent magnet pole 105 topologies which may be used in various embodiments of the alternator for high temperature applications 100, according to some aspects of the present disclosure. The components of each of FIGS. 16A-D are the same (and the same as shown in FIG. 1), however, the orientation of the permanent magnet poles 105 is what differs. In testing, it was determined that a V-type double layer (as shown in FIG. 16C) was the preferred permanent magnet pole 105 topology. This topology allows the permanent magnet poles 105 to stay magnetized even when the alternator for high temperature applications 100 is operated at high temperatures.

Thermal expansion analysis of the alternator for high temperature applications 100 was performed at temperatures of approximately 300° C. and approximately 350° C. The results in indicated that thermal expansion may cause the airgap (i.e., the difference in diameter between the stator 120 and the rotor 110) to increase as both the rotor 110 and stator 120 expand, but not enough to detrimentally affect the performance of the alternator for high temperature applications 100. At both approximately 300° C. and approximately 350° C., the airgap increases to approximately 1.6 mm. The alternator for high temperature applications 100 may have an airgap as large as about 2 mm and still operate at approximately 35 kW, with a rotor 110 speed of approximately 900 rpm, at an operating temperature of approximately 350° C. An airgap increase of approximately 0.5 mm is not expected to significantly impact performance.

The alternator for high temperature applications 100 as described herein may be used in a variety of applications or industries. The alternator for high temperature applications 100 may be used in situations where the ambient environment reaches a high temperature and/or when space and mass are limited such that the alternator device cannot be moved away from the heat source to cool. Example of situations where the alternator for high temperature applications 100 may be used include geothermal drilling applications, oil and gas drilling applications, aviation and aerospace, electric vehicles, and ventilation systems when needed for fire mitigation.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. An alternator for high temperature applications, the alternator comprising:

a stator having an interior; and a rotor comprises a permanent magnet pole embedded within the rotor; wherein:

the rotor is concentrically positioned within the interior of the stator, and the permanent magnet pole comprises samarium cobalt (SmCo);

the alternator is configured to have a power rating of about 35 kW when the rotor has a speed of about 900 rpm and the alternator is at a temperature of about 350° C.

2. The alternator of claim 1, further comprising:

a rotor shaft which is substantially concentric to the stator and the rotor; wherein:

the shaft comprises a hole, and a fluid is configured to flow through the hole.

3. The alternator of claim 2, wherein:

the fluid comprises a drilling fluid.

4. The alternator of claim 3, wherein:

the drilling fluid is configured to cool the alternator.

5. The alternator of claim 1, wherein:

the alternator is capable of operating at temperatures greater than approximately 200° C.

6. The alternator of claim 1, wherein:

the permanent magnet pole comprises a V-type double layer formation, the V-type double layer formation comprises a first permanent magnet pole and a second permanent magnet pole meeting at an angle, and the angle comprises greater than approximately 90°.

7. The alternator of claim 1, wherein:

the stator comprises greater than 25 slots.

8. The alternator of claim 7, wherein:

the stator comprises 27 slots.

9. The alternator of claim 7, wherein:

the stator has a double layer winding, and the stator has a 4 slot span.

10. The alternator of claim 9, wherein:

the double layer winding comprises greater than 4 turns.

11. The alternator of claim 9, wherein:

the double layer winding comprises 5 turns, and the double layer winding comprises 10 turns per slot.

* * * * *